United States Patent
Hegg et al.

(10) Patent No.: US 8,813,186 B2
(45) Date of Patent: Aug. 19, 2014

(54) MODULAR DEVICE AUTHENTICATION FRAMEWORK

(75) Inventors: Joel C. Hegg, Seattle, WA (US); Siddharth Sriram, Seattle, WA (US); Kamlesh T. Talreja, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 21 days.

(21) Appl. No.: 13/499,587

(22) PCT Filed: Sep. 29, 2010

(86) PCT No.: PCT/US2010/050729
§ 371 (c)(1),
(2), (4) Date: Oct. 16, 2012

(87) PCT Pub. No.: WO2011/041419
PCT Pub. Date: Apr. 7, 2011

(65) Prior Publication Data
US 2013/0061291 A1 Mar. 7, 2013

Related U.S. Application Data

(63) Continuation of application No. 12/570,416, filed on Sep. 30, 2009, now abandoned.

(51) Int. Cl.
*G06F 7/04* (2006.01)

(52) U.S. Cl.
USPC ............... 726/2; 726/5; 726/1; 726/4; 726/9; 713/193; 713/168; 709/250

(58) Field of Classification Search
CPC ... H04W 12/08; G06F 21/6209; H04L 9/088; H04L 63/08
USPC ..................... 713/176, 185, 168; 726/12, 2–4
See application file for complete search history.

(56) References Cited

U.S. PATENT DOCUMENTS

| | | | | |
|---|---|---|---|---|
| 6,061,449 A | * | 5/2000 | Candelore et al. | 380/28 |
| 7,243,369 B2 | * | 7/2007 | Bhat et al. | 726/6 |
| 7,356,694 B2 | * | 4/2008 | Mayo et al. | 713/159 |
| 8,005,476 B2 | * | 8/2011 | Karaoguz et al. | 455/435.3 |
| 8,225,110 B2 | * | 7/2012 | Stahl et al. | 713/193 |
| 8,261,356 B2 | * | 9/2012 | Choi et al. | 726/26 |

(Continued)

FOREIGN PATENT DOCUMENTS

| | | |
|---|---|---|
| CN | 1642083 | 7/2005 |
| CN | 1744491 | 3/2006 |

(Continued)

OTHER PUBLICATIONS

A Josang, User Centric identity management, May 2005, Asia Pacific Technology, pp. 1-13.*

(Continued)

*Primary Examiner* — Cordelia Zecher
*Assistant Examiner* — Viral Lakhia
(74) *Attorney, Agent, or Firm* — Lee & Hayes, PLLC (57) ABSTRACT

Systems, methods, and computer-readable media provide a requesting device with access to a service. In one implementation, a server receives a request to access a service, and the request includes a device type identifier of a device requesting access to the service. The server extracts the device type identifier from the request and determines a corresponding device type for the requesting device. An authentication module is selected from a plurality of authentication modules based on the device type identifier, and the selected authentication module implements an authentication scheme for the device type of the requesting device. The server authenticates the request using the selected authentication module to determine whether the requesting device is permitted to access the service, and provides access to the service based on at least a determination that the requesting device is authorized to access the service.

16 Claims, 7 Drawing Sheets

(56) References Cited

U.S. PATENT DOCUMENTS

| | | |
|---|---|---|
| 8,504,729 B2 * | 8/2013 | Pezzutti .................... 709/250 |
| 2004/0010682 A1 | 1/2004 | Foster et al. |
| 2004/0044776 A1 | 3/2004 | Larkin |
| 2004/0236694 A1 * | 11/2004 | Tattan et al. .................. 705/50 |
| 2005/0091539 A1 | 4/2005 | Wang et al. |
| 2005/0198534 A1 * | 9/2005 | Matta et al. .................. 713/201 |
| 2006/0059549 A1 * | 3/2006 | Suzuki et al. .................... 726/9 |
| 2007/0113086 A1 | 5/2007 | Huang et al. |
| 2009/0106433 A1 | 4/2009 | Knouse et al. |
| 2010/0058197 A1 * | 3/2010 | Chee et al. .................. 715/751 |
| 2010/0217990 A1 * | 8/2010 | Abe et al. .................... 713/176 |
| 2010/0306816 A1 * | 12/2010 | McGrew et al. ................ 726/1 |
| 2010/0313225 A1 * | 12/2010 | Cholas et al. .................. 725/62 |

FOREIGN PATENT DOCUMENTS

| | | |
|---|---|---|
| JP | H10304333 | 11/1998 |
| JP | 2004021686 | 1/2004 |
| JP | 2005102188 | 4/2005 |
| JP | 2005135412 | 5/2005 |
| JP | 2006031522 | 2/2006 |
| JP | 2007257426 | 10/2007 |
| JP | 2009290648 | 12/2009 |

OTHER PUBLICATIONS

Non-Final Office Action for U.S. Appl. No. 12/570,416, mailed on Jun. 11, 2012, Joel C. Hegg et al., "Modular Device Authentication Framework", 41 pages.

PCT Search Report for PCT Application No. PCT/US10/50729, mailed Dec. 2, 2010, 10 pages.

Japanese Office Action mailed Apr. 8, 2014 for Japanese patent application No. 2012-532275, a counterpart foreign application of U.S. Appl. No. 12/570,416, 8 pages.

Chinese Office Action mailed Mar. 4, 2014 for Chinese patent application No. 201080044946.8, a counterpart foreign application of U.S. Appl. No. 13/499,587, 19 pages.

* cited by examiner

MODULAR DEVICE AUTHENTICATION FRAMEWORK

PRIORITY APPLICATION

This Application is a 35 U.S.C. 371 National Stage Entry of and claims priority to PCT Application Serial No. PCT/US2010/050729, entitled "Modular Device Authentication Framework," filed on Sep. 29, 2010, which is fully incorporated by reference herein.

BACKGROUND

Online entities offer a wide variety of services to a variety of different client devices, including personal computers (PCs), portable digital assistants (PDAs), mobile telephones, pocket PCs, smartphones, set-top boxes, digital video recorders (DVRs), and gaming consoles, among other possibilities. These client devices often access various web services, such as online stores or other providers of audio/visual content, software programs, digital books, or other electronic content. In many cases, requests by different client devices for a particular web service must be authenticated before the web service honors the request.

Different client devices often support different authentication mechanisms that provide access to the web services. For example, some device types may use proprietary authentication mechanisms that are unique to the particular brand of the device. Other device types may use authentication mechanisms of a more general application, such as Secure Sockets Layer ("SSL"). In some cases, this problem is addressed by providing separate web services for each type of device, such that each web service implements a particular authentication mechanism. However, when separate web services are provided in this manner, there may be substantial duplication of effort between the various web services, because entities must implement each authentication scheme as a separate web service that is tailored to a particular device type. Furthermore, vendors may use different addresses for each web service, such as Uniform Resource Locators ("URLs"). This may cause users with multiple device types some confusion. For example, a user may not realize that a single vendor has multiple web sites and corresponding URLs for each of the user's devices. Thus, the user may use an incorrect URL in trying to access a web service with one device, even though the URL may work properly for another device. Although existing mechanisms can work around this problem, for example by redirecting a device to a correct URL, these mechanisms are ad hoc and may not be supported by all device types. Therefore, systems and methods are needed to overcome these limitations of traditional device authentication mechanisms.

BRIEF DESCRIPTION OF THE DRAWINGS

The accompanying drawings, which are incorporated in and constitute a part of this disclosure, illustrate various disclosed embodiments. In the drawings.

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, or adding steps to the disclosed methods. Accordingly, the following detailed description is not limiting of the disclosed embodiments. Instead, the proper scope is defined by the appended claims.

Disclosed embodiments provide systems and methods for providing access to a service, such as a web service. The systems and methods may allow a number of different device types to access a single web service, even when the device types implement different authentication schemes. For example, a server providing the web service may store several device-type specific authentication modules. When a particular device requests access to the web service, the server may extract a device type identifier from the request. The server may then select the appropriate authentication module for authenticating the requesting device.

Consistent with a disclosed embodiment, a computer-implemented method provides access to a service. According to the method, authentication modules are stored to authenticate devices requesting access to the service. The devices include at least a first plurality of devices having a first device type and a second plurality of devices having a second device type. A first one of the authentication modules is configured to perform authentication of the first plurality of devices using an authentication scheme specific to the first device type. A second one of the authentication modules is configured to perform authentication of the second plurality of devices using an authentication scheme specific to the second device type. A server receives a request to access the service, and the request includes a device type identifier of a device requesting the service. The device type identifier is extracted from the request, and the method determines whether device type identifier corresponds to the first device type or the second device type. The first authentication module is selected when the device type identifier corresponds to the first device type, and the second authentication module is selected when the device type identifier corresponds to the second device type. The request is authenticated using the selected authentication module to determine whether the requesting device is permitted to access the service, thereby performing authentication of the requesting device using the authentication scheme specific to the requesting device. If the selected authentication module determines that the requesting device is authorized to access the service, access to the service is provided. If the selected authentication module determines that the requesting device is not authorized to access the service, access to the service is prevented.

Consistent with another disclosed embodiment, a computer implemented method provides access to a service. According to the method, a request to access the service is received, and the request includes a device type identifier of a device requesting access to the service. The device type identifier is extracted from the request, and a corresponding device type for the requesting device is determined. An authentication module is selected from a plurality of authentication modules based on the device type identifier, and the selected authentication module implements an authentication scheme for the device type of the requesting device. The request is authenticated using the selected authentication module to determine whether the requesting device is permitted to access the service. Access to the service is provided based on at least a determination that the requesting device is authorized to access the service.

Consistent with another disclosed embodiment, a server provides access to a service. The server includes a processor for executing program instructions, and a computer-readable medium storing the program instructions. The program instructions, when executed by the processor, performing a process to receive a request to access a service. The request includes a device type identifier of a device requesting access to the service. The program instructions extract the device type identifier from the request, and determine a corresponding device type for the requesting device. The program instructions select an authentication module from a plurality of authentication modules based on the device type identifier, and the selected authentication module implements an authentication scheme for the device type of the requesting device. The program instructions authenticate the request using the selected authentication module to determine whether the requesting device is permitted to access the service, and provide access to the service based on at least a determination that the requesting device is authorized to access the service.

Figure 1:
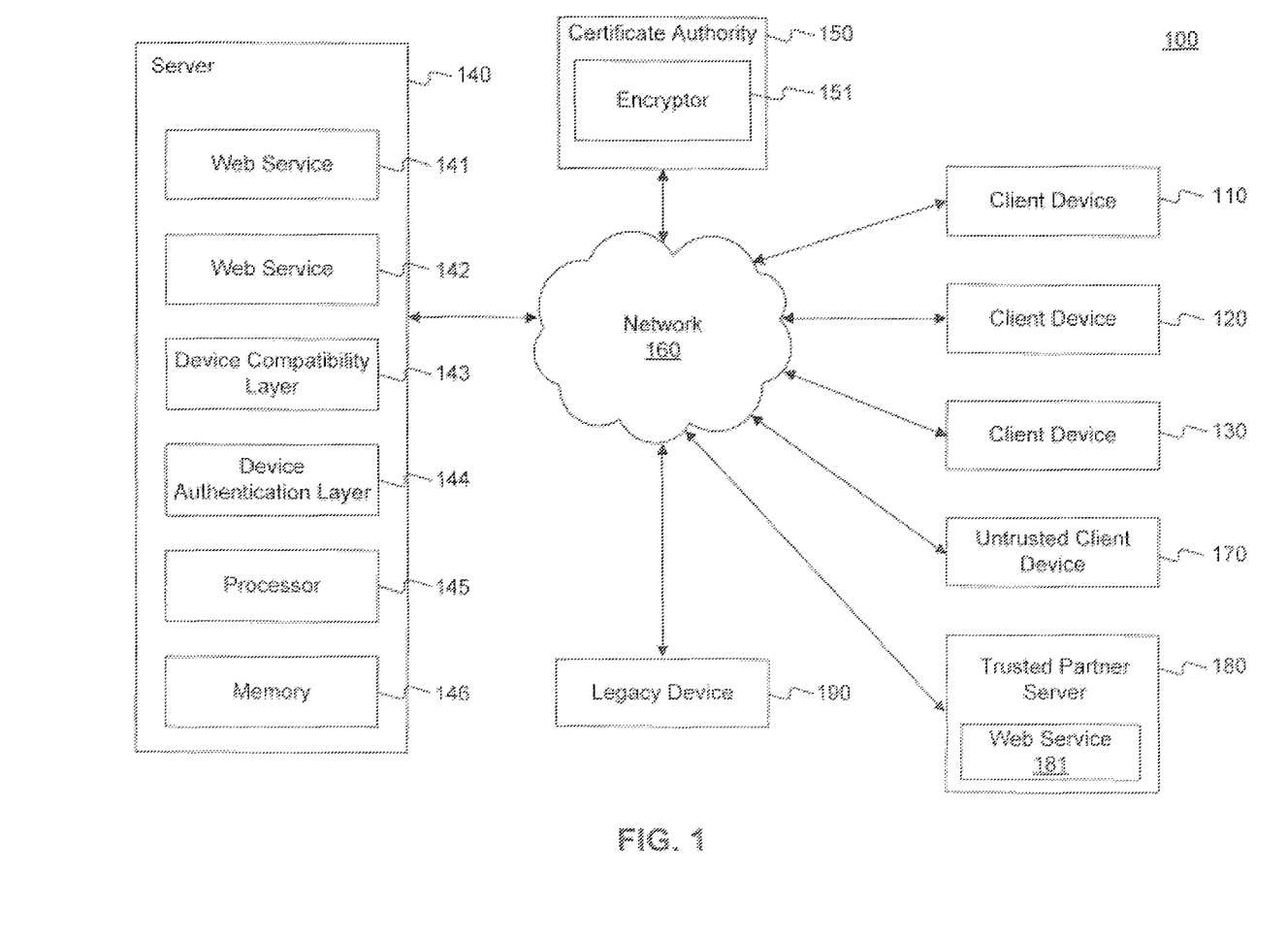
FIG. 1 is a diagram of an example of a system for providing access to a service.

FIG. 1 is an example of a system 100 for providing access to a service, consistent with disclosed embodiments. System 100 may provide functionality for one or more client devices to access a service (e.g., a web service) executing on a server. As shown in system 100, clients 110, 120, and 130, server 140, certificate authority 150, untrusted client device 170, trusted partner server 180, and legacy device 190 are connected to a network 160. One of skill in the art will appreciate that although a particular number of components are depicted in FIG. 1, any number of these components may be provided. One of ordinary skill in the art will also recognize that functions provided by one or more components of system 100 may be combined into one component, or distributed across a plurality of components. For example, server 140 may be implemented using a server farm including several main servers as well as several backup servers. In addition, server 140 may be implemented by distributing various processing steps discussed herein across multiple servers. Network 160 provides communications between the various components in system 100, such as client devices 110, 120, and 130, server 140, certificate authority 150, untrusted client device 170, trusted partner server 180, and legacy device 190. Network 160 may be a shared, public, or private network, may encompass a wide area or local area, and may be implemented through any suitable combination of wired and/or wireless communication networks. Furthermore, network 160 may comprise an intranet or the Internet.

Server 140 may comprise a general purpose computer (e.g., a personal computer, network computer, server, or mainframe computer) having one or more processors 145 that may be selectively activated or reconfigured by a computer program. Processor 145 may perform steps or methods consistent with disclosed embodiments by reading processing instructions from memory 146, and executing the instructions. In particular, web service 141 and web service 142 may be implemented as instructions stored in memory 146, suitable for execution by processor 145. Memory 146 may be one or more memory or storage devices that-store data as well as software. Memory 146 may also comprise, for example, one or more of RAM, ROM, magnetic storage, or optical storage. Furthermore, memory 146 may store program modules that, when executed by processor 140, perform one or more steps discussed below.

In other embodiments, server 140 may be specially constructed for carrying-out methods consistent with disclosed embodiments. For example, one or more of the processing steps disclosed herein may be implemented on a field-programmable gate array ("FPGA"), application-specific integrated circuit ("ASIC") or suitable chipset. Encryption and decryption steps discussed herein may be particularly suitable for implementation on such hardware devices. Server 140 may provide access to various services, such as web service 141 and web service 142. Server 140 may also provide functionality for authenticating client devices 110, 120, and 130, and/or users operating such client devices. For example, an entity that provides audio/visual or software content over network 150 may provide such content using web services 141 and 142.

As client devices 110, 120, and 130 may use different communication protocols or data formats, server 140 may also include a device compatibility layer 143, which is discussed in more detail in U.S. application Ser. No. 12/165,188, entitled "Client-to-Service Compatibility Framework," filed on Jun. 30, 2008, the disclosure of which is expressly incorporated herein by reference in its entirety. For example, device compatibility layer 143 may translate communications from client devices 110, 120, and 130 into a form compatible with web services 141 and 142. Server 140 may also include a device authentication layer 144 for authenticating web devices 110, 120, and 130, as discussed in more detail below.

Certificate authority 150 may comprise a general purpose computer (e.g., a personal computer, network computer, server, or mainframe computer) having one or more processors (not shown) that may be selectively activated or reconfigured by a computer program. Furthermore, certificate authority 150 may communicate via network 160 with server 140 as well as client devices 110, 120, and 130. Certificate authority 150 may be implemented using server farms, distributed technologies, and various combinations of software and hardware in a manner analogous to the discussion above with respect to server 140. Certificate authority 150 may include an encryptor 151 for generating digital signatures that are included with digital certificates, as discussed in more detail below.

Client devices 110, 120, and 130 may be any type device for communicating with server 140 and certificate authority 150. For example, client devices 110, 120, and 130 may be personal computers, handheld devices (e.g., PDAs, cellular phones such as smartphones, etc.), televisions, digital music players, set-top boxes, digital video recorders (DVRs), or gaming consoles, or any other appropriate computing platform or device capable of exchanging data with network 160. Client devices 110, 120, and 130 may each include, for example, one or more processors and one or more memories (not shown). Users may access web services 141 and 142 on server 140 over network 160 through suitable application logic implemented on client devices 110, 120 and 130, such as a web browser. For example, server 140 may transmit a document (e.g., a web page) that is processed by application logic on client devices 110, 120 and 130, and displayed to a user. The document may include options for a user to log onto one or more secure services provided by server 140, such as web service 141 and web service 142. For example, users may log onto web service 141 and 142 to access digital content for use on client devices 110, 120, and 130, by supplying credentials, such as a user name (e.g., an email address) and a password.

Untrusted client device 170 may be similar to client devices 110, 120, and 130, as discussed above. However, untrusted client device 170 may be of a device type that does not support authentication mechanisms that are available on server 140. Trusted partner server 180 may be similar to server 140, as discussed above. Trusted partner server 180 may provide access to a web service 181, which may be similar to web services 141 and 142. Untrusted client device 170 may communicate with trusted partner server 180 to access web services 141 and 142. For example, untrusted client device 170 may authenticate with trusted partner server 180, and trusted partner server 180 may provide untrusted client device 170 with a secure token. Untrusted client device 170 may then use the secure token to access web service 141.

Server 140 may receive requests from client devices 110-130, untrusted client device 170, and legacy device 190 to access web services 141 and 142. Server 140 may then select an appropriate authentication module for authenticating each request. The selected authentication module may be dependent upon the device that issued the request. In this manner, server 140 may provide device-type specific authentication schemes via the selected authentication modules.

Figure 2:
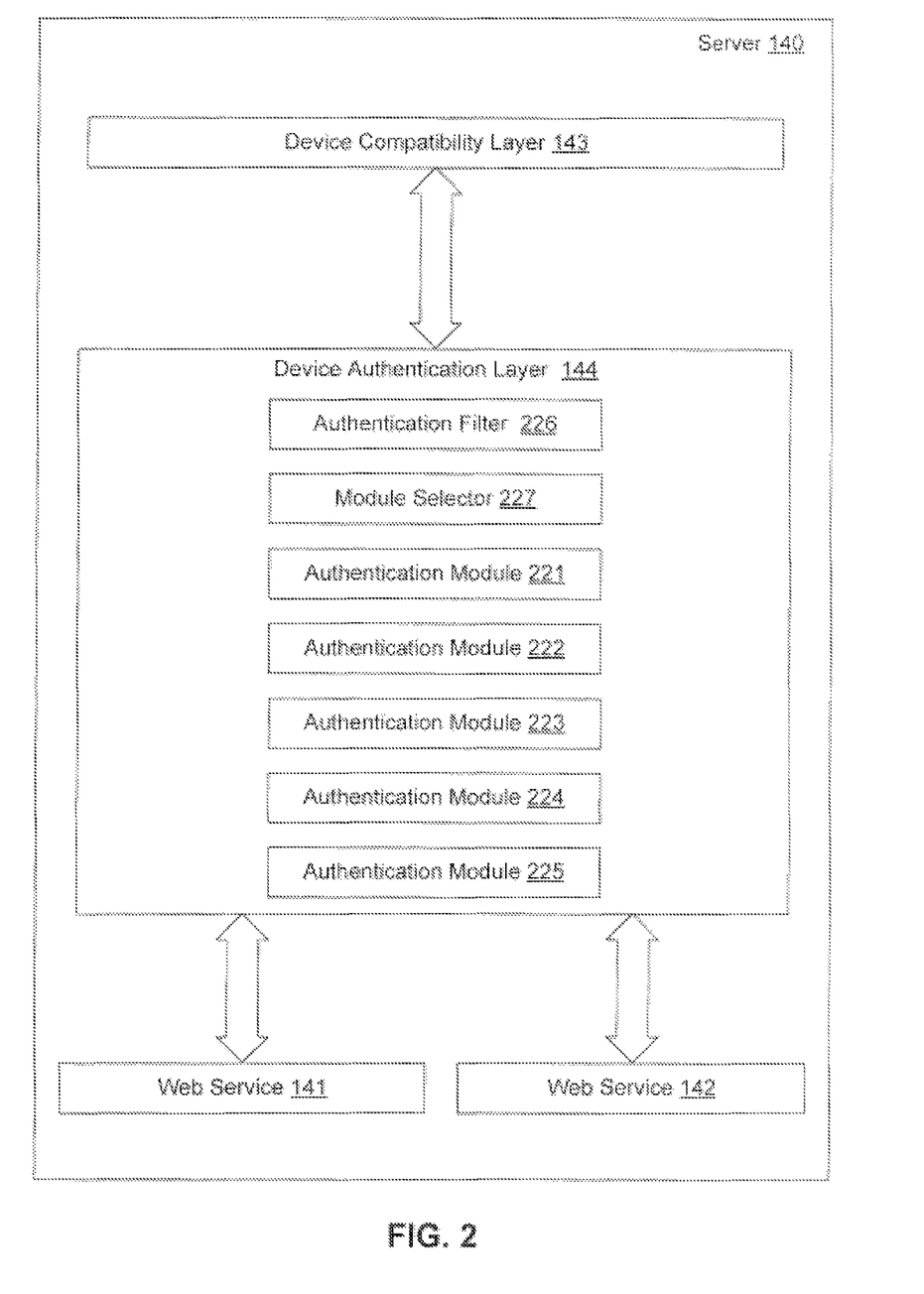
FIG. 2 is diagram of an example of an architecture of a server.

FIG. 2 shows a diagram of an example of an architecture of server 140, consistent with disclosed embodiments. As discussed above, server 140 may include device compatibility layer 143 for translating communications from client devices 110, 120, and 130 into a form compatible with web services 141 and 142. Server 140 may also include a device authentication layer 144 for authenticating client devices 110, 120, and 130 using authentication modules 221-225. Server 140 may also include an authentication filter 226 and a module selector 227, which collectively serve to route requests from client devices 110, 120, and 130 to an appropriate one of authentication modules 221-225, as discussed in more detail below.

After the client requests are authenticated by one of the authentication modules 221-225, the requests are passed to an appropriate service, such as web service 141 or web service 142. Alternatively, if the requests are not authenticated, the appropriate authentication module may not route the request to a service. Web service 141 may be a "default" or "standard" web service, to which most requests are routed after authentication. Web service 142 may be a legacy web service with a built-in authentication mechanism, and may be specific to a particular legacy device type such as legacy device 190. As discussed below, as authentication modules 221-225 authenticate various requests from client devices 110, 120, and 130, the authenticated requests are passed on to the appropriate web service. Although FIG. 2 illustrates a certain number and arrangements of components, any number or arrangement of authentication modules or other components may be used in server 140.

Figure 3:
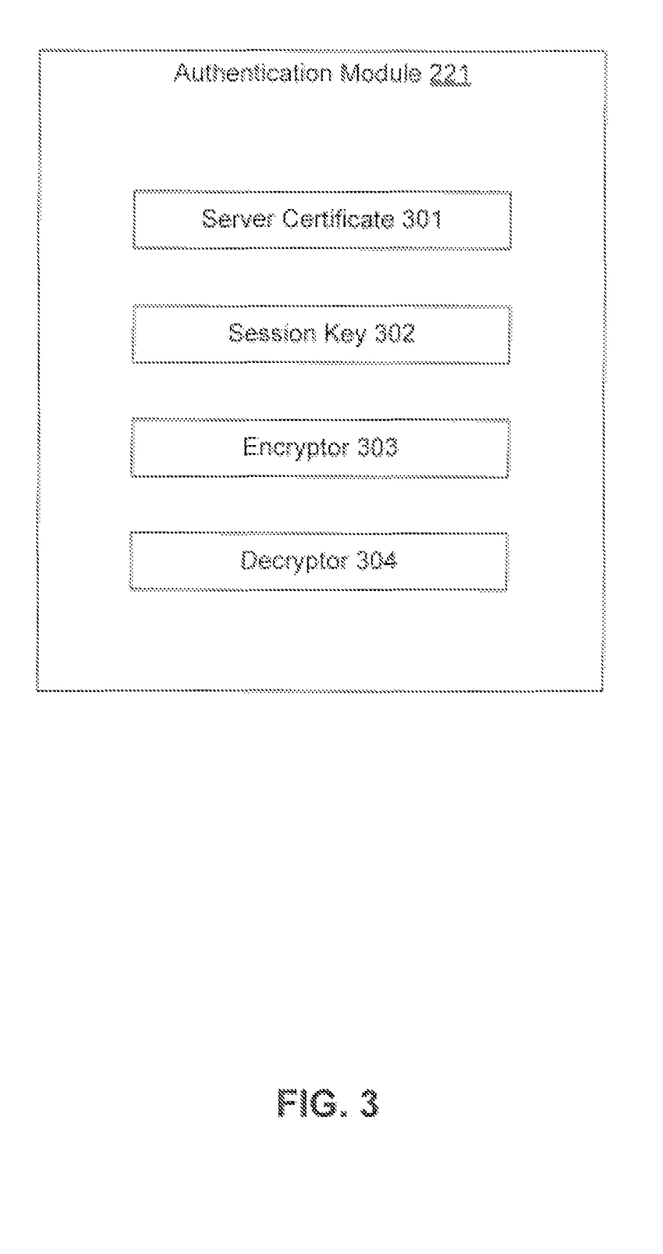
FIG. 3 is a diagram of an example of an architecture for an authentication module.

FIG. 3 illustrates an exemplary block diagram of an architecture of authentication module 221, consistent with disclosed embodiments. Authentication module 221 may implement an authentication scheme that is supported by a number of different device types. For example, for purposes of the following discussion, client devices 110 and 130 are of two different device types. Client devices 110 and 130 may both implement SSL (Secure Sockets Layer), a security protocol that allows secure communications across a network. Authentication module 221 may implement SSL on server 140 to securely communicate with and authenticate client devices 110 and 130. In some embodiments, authentication module 221 may implement TLS (Transport Layer Security) protocol, an upgraded version of SSL.

To implement SSL/TSL processing, authentication module 221 may store a server certificate 301. Server certificate 301 may be used to authenticate server 140 to one or more client devices, as discussed in more detail below. Authentication module 221 may also store a session key 302 for encrypting communications during a particular SSL/TSL session with one or more client devices. Server 140 may use encryptor 303 to create digital signatures, and server 140 may use decryptor 304 to verify digital signatures, as discussed in more detail below. These SSL/TSL sessions may be used by client devices to download electronic content from web service 141.

Figure 4:
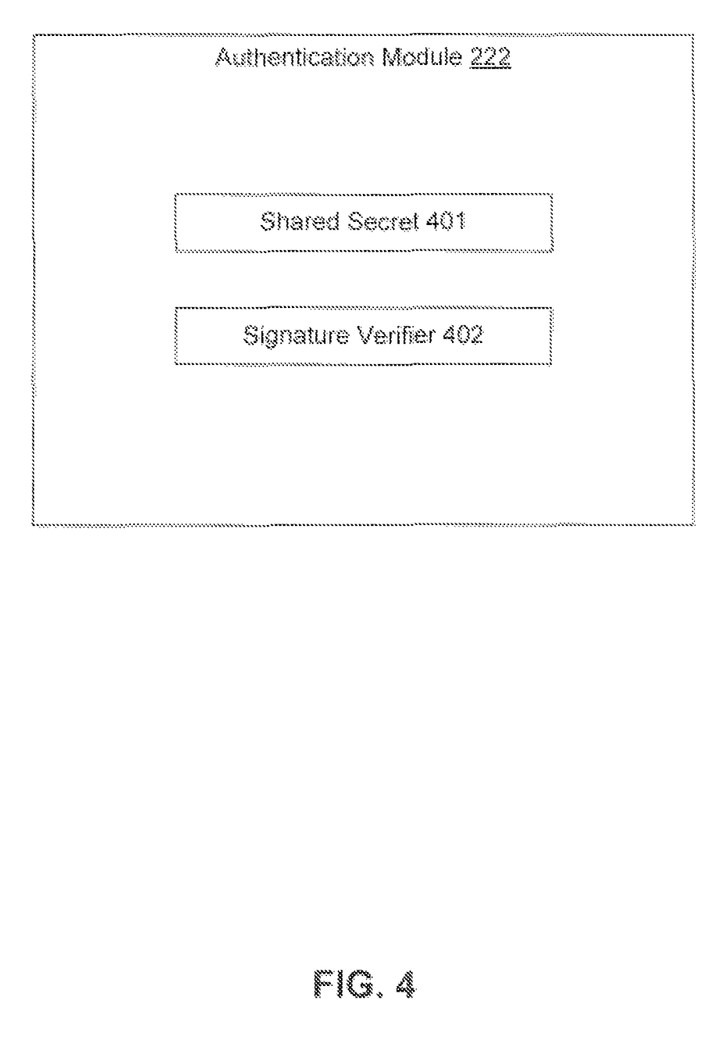
FIG. 4 is a diagram of an example of an architecture for another authentication module.

FIG. 4 illustrates an exemplary block diagram of an architecture of authentication module 222, consistent with disclosed embodiments. Authentication module 222 may implement a proprietary authentication scheme, supported by one or more device types associated with a particular device manufacturer. Further, client device 120 may be a device that uses the proprietary authentication scheme.

Authentication module 222 may implement the proprietary authentication scheme on server 140 to securely communicate with and authenticate device 120. In some embodiments, authentication module 222 is provided by the device manufacturer associated with the proprietary authentication scheme. Authentication module 222 may store a shared secret 401, which is also stored in client device 120. Authentication module 222 may also include a signature verifier 402, which is used to verify signatures of requests to access web services that are sent by client device 120. Authentication modules 223, 224, and 225 may implement various other authentication schemes. For example, authentication module 223 may be a "no-op" module that simply allows data to pass through without authentication. Authentication module 223 may be used both for development purposes, as well as for accessing web service 142. Allowing the request to pass through authentication module 223 without authenticating the request does not compromise security, because web service 142 has an internal authentication scheme.

Authentication module 224 may implement a "Session Authentication" scheme whereby untrusted client device 170 can access web service 141. To do so, untrusted client device 170 may cooperate with trusted partner server 180. Trusted partner server 180 may access web service 141 using authentication module 221, and acquire a secure token from server 140. Server 140 may store a secret cryptographic key that is used to create the secure token. Alternatively, trusted partner server 180 may also store a copy of the cryptographic key. In such embodiments, trusted partner server 180 may create the secure token. In either case, the secure token may comprise encrypted data, such as an identifier of untrusted client device 170. Once trusted partner server 180 has created the secure token or obtained the secure token from server 140, trusted partner server 180 may then provide the secure token to untrusted client device 170. Untrusted client device 170 may send the token with a request for web service 141 to server 140, and authentication module 225 may authenticate the request by validating the token. For example, authentication module 225 may authenticate the secure token by decrypting the token with the cryptographic key, and verifying the identifier of untrusted client device 170.

In some embodiments, the secure token is created by server 140 or trusted partner server 180 using a private key from an asymmetric key pair. In such embodiments, a corresponding public key may be used to decrypt the secure token to determine whether the secure token is authentic. Authentication module 225 may implement an IP white list authentication scheme that stores a list of registered IP addresses. Authentication module 225 may only allow requests from registered IP addresses to pass through to web service 141. To do so, authentication module 225 may determine an IP address associated with a request, compare the IP address to a white list of allowable IP addresses, and provide access to web service 141 if the IP address associated with the request is on the white list.

Authentication module 225 may be particularly useful when integrating new device types to access web service 141. For example, a new device type may ultimately be intended to support the authentication scheme of authentication module 221. However, when developing and integrating the new device type to access web service 141, it may be more efficient to forego using authentication module 221. By using the IP white list to limit the devices that can request web service 141, device integration can proceed more quickly. During the device integration process, the new device type may be transitioned over to use authentication module 221 once core functionality has been tested.

Figure 5:
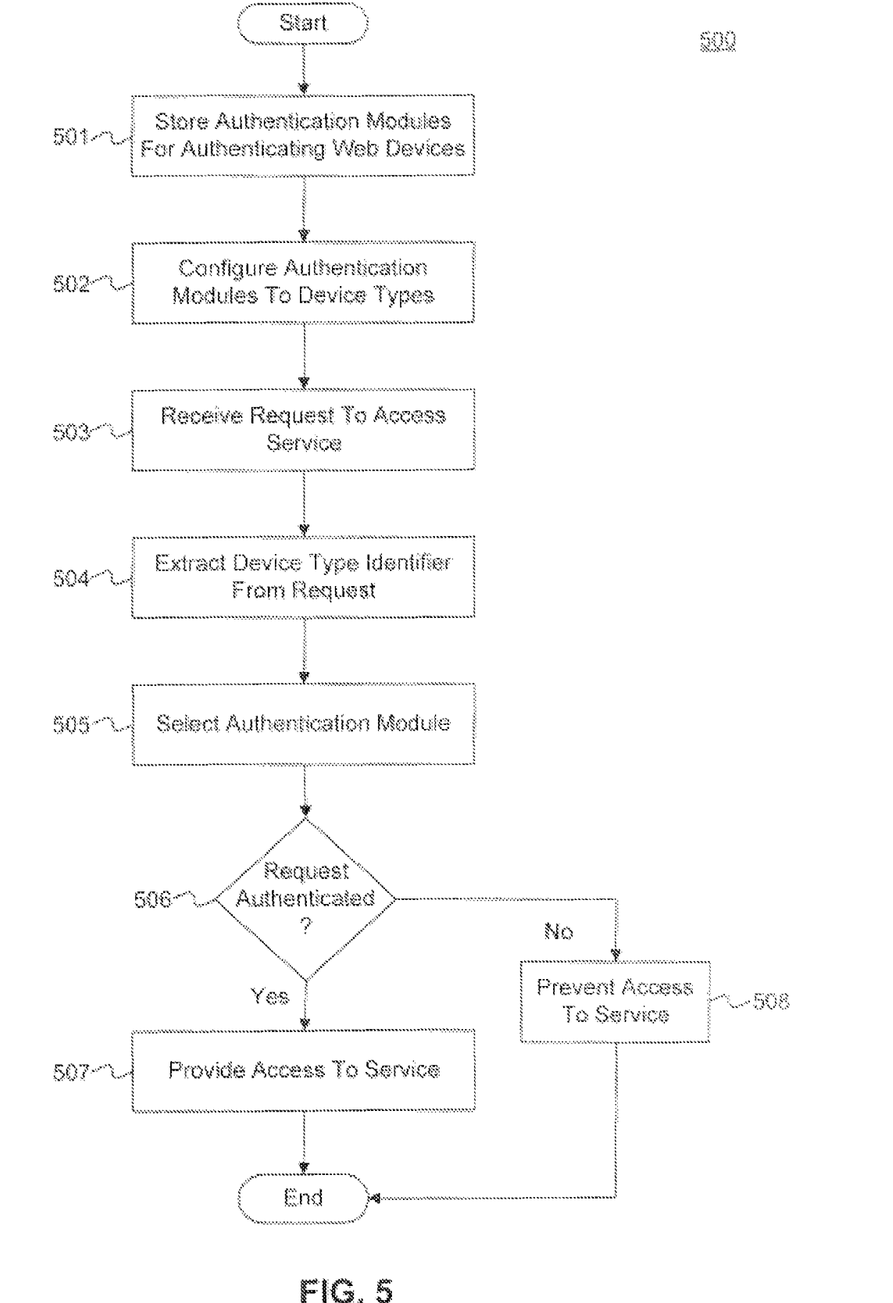
FIG. 5 is a flow diagram of an example of a routine for providing access to a service.

FIG. 5 is a flow diagram of an example of a routine 500 for providing access to a service, consistent with disclosed embodiments. Routine 500 may implement processes according to one or more of program modules stored in memory 146.

At the start of routine 500, in block 501, server 140 may store authentication modules 221-225 for authenticating client devices 110, 120, and 130, as well as untrusted client device 170. As discussed above, client devices 110,120, and 130 may be of various device types that use different authentication schemes. In some embodiments, authentication modules 221-225 may comprise one or more classes that each implement a common interface. As understood to those skilled in the art, an interface may define a set of methods that each class implementing the interface must support. Thus, each of authentication modules 221-225 may comprise a class that supports a common set of authentication methods defined by the interface.

In block 502, server 140 may configure authentication modules 221-225 to implement the specific authentication schemes discussed above. For example, an administrator may interact with server 140 to configure application module 221 to implement the SSL protocol supported by client devices 110 and 130. The administrator may also configure application module 222 to implement the proprietary protocol supported by client device 120. Likewise, the administrator may also configure application modules 223, 224, and 225 to implement the no-op, white list, and session authentication schemes discussed above.

From the perspective of external application software on server 140, e.g., web services 141 and 142, device compatibility layer 210, authentication filter 226, and module selector 227, the authentication schemes may be invoked using one or more of the methods defined by the common interface. Thus, the details of the underlying authentication schemes may be abstracted using the interface, and external software can invoke the common methods using the appropriate authentication module.

Next, in block 503, server 140 may receive a request to access web service 141 or web service 142. As discussed above, web service 141 may be a default web service, whereas web service 142 may be a web service typically accessed by certain legacy device types. As discussed in more detail below, server 140 may route the requests to appropriate authentication modules to authenticate the requests, before allowing the requests to reach web services 141 and 142.

Next, in block 504, authentication filter 226 may extract a device type identifier from the request to determine which type of device is requesting web service 141. In some embodiments, authentication filter 226 is a J2EE filter that searches a request header or parameter list in the request for the device type identifier. In some embodiments, other mechanisms may be used to determine the device type, such as mapping a device serial number or MAC ID to a table that stores corresponding device types. In block S505, device authentication filter 226 may provide the extracted device type identifier to module selector 227. Module selector 227 may determine the appropriate authenticator module 221-225 to authenticate the request, based on the extracted device type identifier. In some embodiments, module selector 227 is a java bean that is configured with a table of device type identifiers, each of which is mapped to a particular one of authentication modules 221-225.

Next, in decision block 506, the authentication module that was selected at block 505 may determine whether to authenticate the request As discussed in more detail below, authentication modules 221-225 may each implement different authentication schemes for authenticating the requests. However, regardless of which authentication module authenticates the request at decision block 506, additional security techniques can be applied beyond those implemented by the selected authentication module. For example, users of the client devices may be authenticated by providing a user name and password, in addition to the authentication required by the selected authentication module. Moreover, in some embodiments, multiple authentication modules may collectively authenticate certain requests.

As shown in FIG. 5, if the selected authentication module(s) authenticate the request, routine 500 moves to block 507. In block 507, server 140 provides access to the requested service, e.g., web service 141/142. Thus, the requesting device can access electronic content that is available from web service 141/142. However, if the selected authentication module(s) do not authenticate the request, routine 500 moves to block 508, and server 140 prevents access to the requested web service 141/142. In some embodiments, the requesting device may be permitted an unlimited number of attempts to authenticate. In other embodiments, subsequent requests from a requesting device may be blocked after a certain number of attempts.

As discussed above, in block 505 of routine 500, server 140 may select an authentication module to authenticate a request that is received from a device. Depending on the device type of the device sending the request, different authentication modules are selected in block 505. For example, any one of authentication modules 221-225 may be selected. The following discussion provides an overview of processing to select one of authentication modules 221-225.

Authentication module 221 may be used to authenticate both client device 110 and client device 130. Client devices 110 and 130 may be of different device types that are both mapped to authentication module 221. When either client device 110 or client device 130 sends a request for web service 141, module selector 227 selects authentication module 221. Authentication module 221 may then authenticate the request using SSL, as shown in more detail below with respect to FIG. 6. Although client devices 110 and 130 may be devices of different types that use different device type identifiers, both device types may be mapped to authentication module 221.

Authentication module 222 may be used to authenticate device types, such as client device 120. Accordingly, based on the extracted device type identifier for client device 120, module selector 227 may select authentication module 222. As discussed above, authentication module 222 implements a proprietary authentication scheme, which is supported by the manufacturer of certain device types, such as client device 120. Authentication module 222 may authenticate the request using the proprietary authentication scheme, as discussed in more detail below with respect to FIG. 7. Authentication module 223 may be used to authenticate legacy device types, such as legacy device 190. As discussed, legacy device 190 uses web service 142, a legacy web service with a built-in authentication scheme. Based upon the device type identifier extracted from requests from legacy device 190, module selector 227 may select authentication module 223. As discussed, authentication module 223 may implement a no-op authentication scheme, because requests are permitted to pass directly through authentication module 223 to web service 142. However, security may be maintained because web service 142 implements built-in legacy authentication mechanisms for authenticating the request. In some embodiments, requests for web service 142 may be accessed at a distinct URL from requests to access web service 141.

Authentication module 224 may be used to authenticate devices, such as untrusted client device 170. Untrusted client device 170 may use a device type identifier that is not recognized by module selector 227. When a device type identifier is not from a trusted device, module selector 227 may select authentication module 224 to authenticate the request through trusted partner server 180. To do so, untrusted client device 170 may include an identifier of trusted partner server 180 with the request. Authentication module 224 may create a secure token, and transmit the secure token to trusted partner server 180. Alternatively, trusted partner server 180 may create the secure token. The secure token may be created by encrypting data, such as an identifier of untrusted client device 170, with a cryptographic key.

Untrusted client device 170 may take steps to authenticate with trusted partner server 180, rather than directly authenticating with server 140. For example, untrusted client device 170 may authenticate with trusted partner server 180 using a user name and password. Once trusted partner server 180 has authenticated the request, trusted partner server 180 may transmit the secure token to untrusted client device 170.

Untrusted client device 170 may access web service 141 by including the secure token in subsequent communications with server 140. For example, authentication module 224 may authenticate the secure token by decrypting the secure token with the cryptographic key. In some embodiments, the secure token may expire after a preset duration. Server 140 may not allow access to web service 141 using expired tokens.

Authentication module 225 may implement an IP white list authentication scheme. As this technique can be readily implemented without any corresponding support by or modifications to client devices, authentication module 225 may be used on virtually any request for web service 141 or 142. For example, authentication module 225 may be used to authenticate any request from client devices 110 and 130. In such embodiments, authentication module 225 may check the IP address of the device that sent the request. If the IP address is on the white list, authentication module 225 could then provide the request to authentication module 221 for subsequent processing. Authentication module 225 may be used in a similar manner in conjunction with authentication modules 222, 223, and 224. Further, as discussed above, in some embodiments, authentication module 225 may be used for stand-alone authentication of requests. For example, authentication module 225 may be used during a device integration phase when web service 141 is being tested to support a new device type.

In some embodiments, one or more of authentication modules 221-225 may provide limited access to web service 141, even if the requesting device is not authenticated. For example, web service 141 may provide a plurality of methods, some of which are used to access electronic content, and others that are used to browse various features of web service 141. In such embodiments, one or more of authentication modules 221-225 may provide access to web service 141 when the requesting device is accessing methods used to browse web service 141, but may require authentication before allowing the requesting device to access methods for downloading electronic content.

SSL/TSL Authentication

Figure 6:
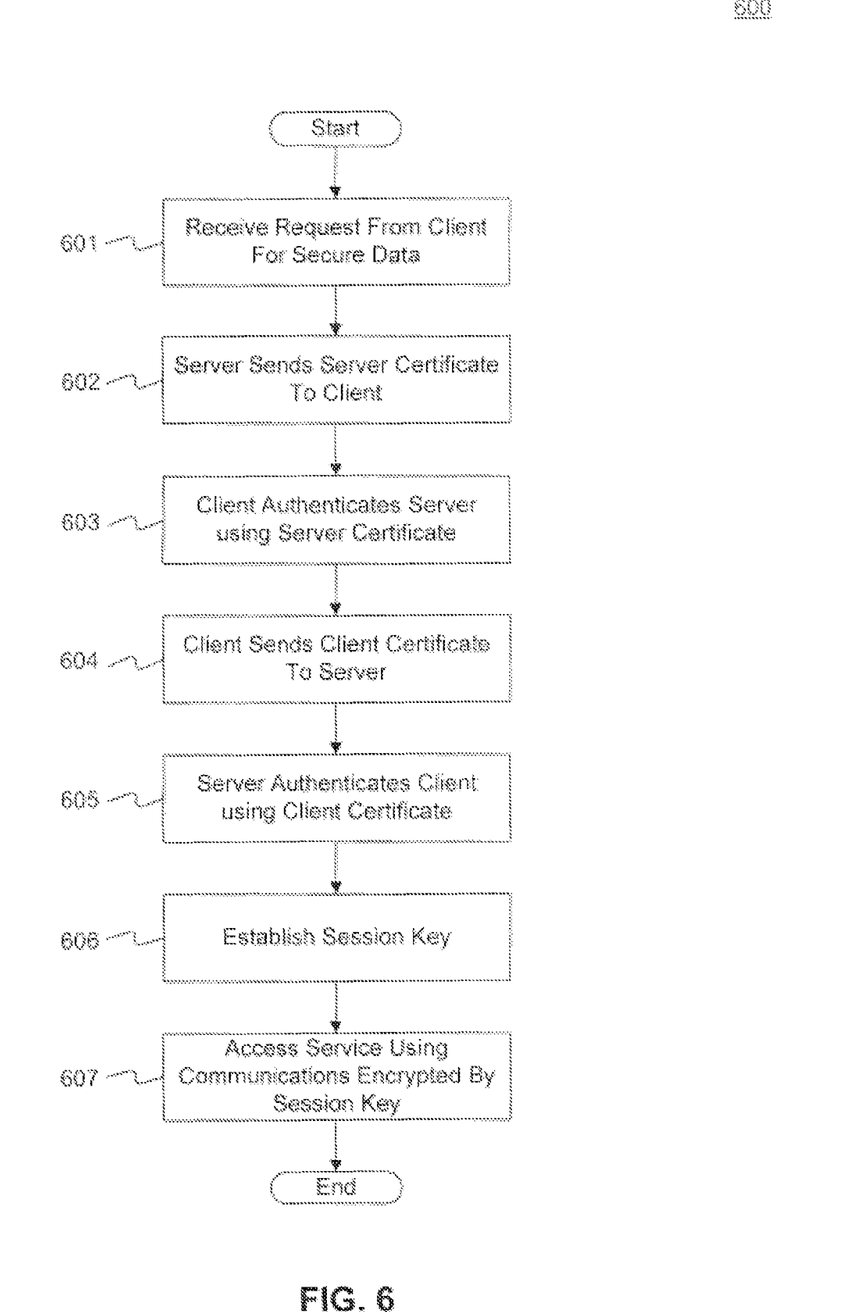
FIG. 6 is a flow diagram of an example of a routine for authenticating a device request.

As discussed above, authentication module 221 may use SSL or TSL to perform authentication of requests for web service 141. FIG. 6 illustrates an exemplary routine 600 used by authentication module 221 to implement block 506 of routine 500. The following discussion assumes that client device 110 is requesting access to web service 141. However, as already discussed, client devices 110 and 130 may both support SSL/TSL authentication. As discussed below, both client device 110 and server 140 may perform steps to authenticate one another using routine 600.

At block 601, authentication module 221 may receive a request for web service 141 from client device 110. As discussed, the request may be to access any type of secure data, such as electronic content available from web service 141. Further, as discussed, the request may be passed to authentication module 221 from module selector 227. Next, in block 602, authentication module 221 on server 140 may send stored server certificate 301 to client device 110. Server certificate 301 may include an identifier for server 140, an identifier of certificate authority 150, and a public encryption key unique to server 140. Server certificate 301 may also include a digital signature generated by certificate authority 150.

After client device 110 receives server certificate 301, in block 603, client device 110 authenticates server 140 using server certificate 301. For example, client device 110 may first verify the digital signature to ensure that server certificate 301 was created by certificate authority 150. Then, client device 110 may extract the public encryption key from server certificate 301, and use the public encryption key to authenticate communications from server 140. Next, in block 604, client device 110 may send a client certificate to server 140. The client certificate may include an identifier of client device 110, an identifier of certificate authority 150, and a public key unique to client device 110. The client certificate may also include a digital signature that was generated by certificate authority 150 using encryptor 151. For example, prior to routine 600, certificate authority 150 may have generated the client certificate, transmitted the certificate to client device 110, and stored the client certificate on client device 110.

Next, in block 605, server 140 authenticates client device 110 using the client certificate. For example, server 140 may first verify the digital signature on the client certificate to ensure that server certificate 301 was created by certificate authority 150. Then, server 140 may extract the public encryption key from the client certificate, and use the public encryption key to verify communications from client device 110, using decryptor 304. Next, routine 600 moves to block 606. In block 606, client device 110 and server 140 may mutually establish a private key used to encrypt communications between them. This private key is shown in FIG. 3 as session key 302. In block 607, client device 110 may access web service 141 using communications encrypted by session key 302. In some embodiments, session key 302 is a symmetric encryption key, which allows for more efficient encryption processing by server 140 and client device 110.

In some embodiments, client device 110 may authenticate communications from server 140 at block 603 by verifying digital signatures that server 140 attaches to the communications. In such embodiments, server 140 may generate the digital signatures using encryptor 303 with a unique private encryption key that was provided to server 140 in advance of routine 600 by certificate authority 150. This unique private key may be one key from an asymmetric key pair that also includes the unique public key assigned to sever 140.

Similarly, in some embodiments, server 140 may authenticate communications from client device 110 at block 605 by verifying digital signatures that client device 110 attaches to the communications. In such embodiments, client device 110 may generate the digital signatures using a unique private encryption key provided to client device 110 in advance of routine 600 by certificate authority 150. This unique private key may be one key from an asymmetric key pair that also includes the unique public key assigned to client device 110.

In yet other embodiments, authentication module 221 may not perform all of the blocks of routine 600. For example, a separate load-balancing module (not shown) may be provided on server 140. The load-balancing module may be responsible for distributing workloads across a plurality of servers, and may also implement SSL/TSL processing. In such embodiments, the load-balancing module implements routine 600, and provides a result to authentication module 221 indicating whether the client certificate is determined to be valid at block 605. If so, authentication module 221 allows access to web service 141. Otherwise, authentication module 221 prevents access to web service 141.

Proprietary Authentication

Figure 7:
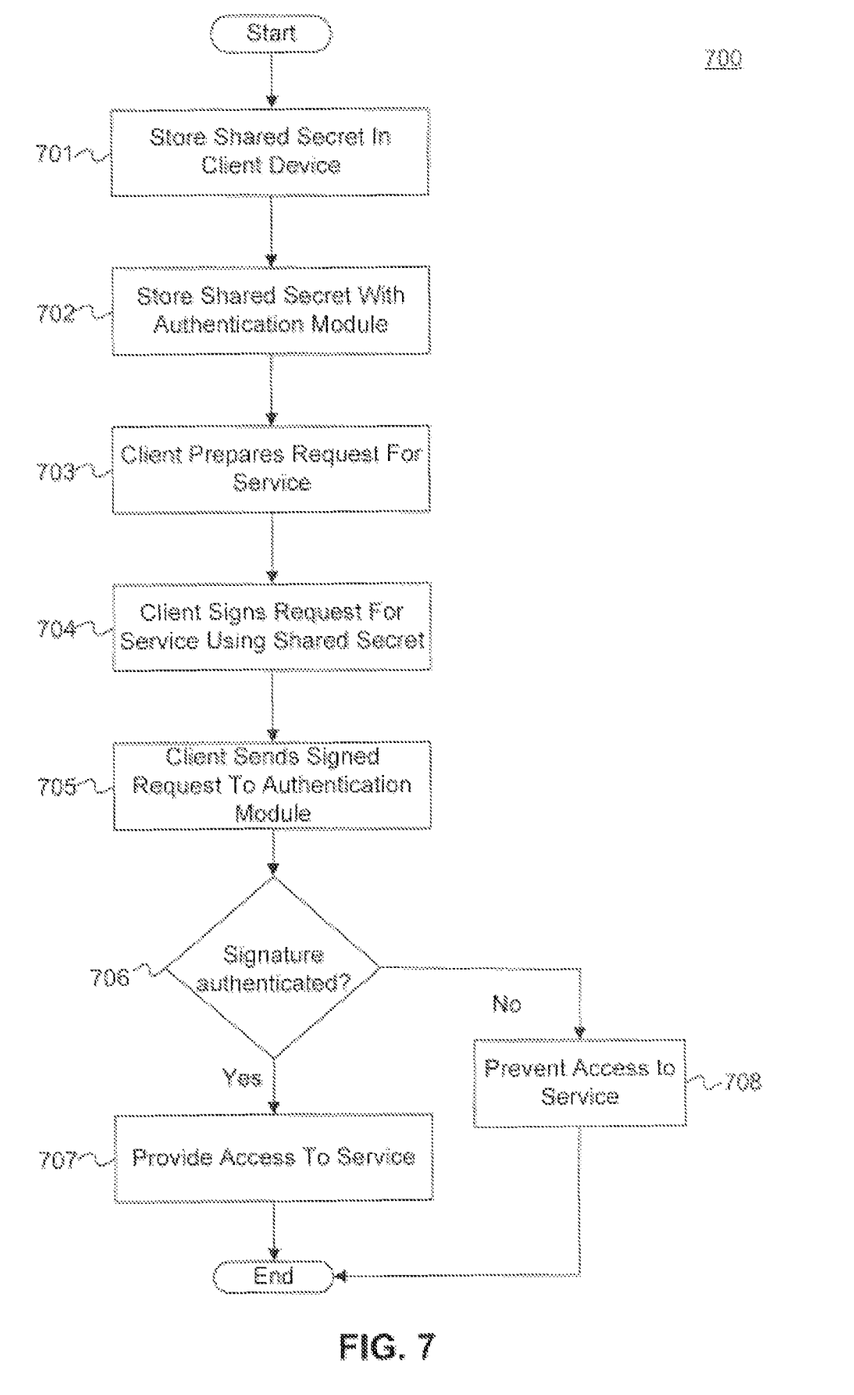
FIG. 7 is a flow diagram of an example of another routine for authenticating a device request.

As discussed above, client device 120 may support a proprietary authentication scheme, and authentication module 222 may implement the proprietary authentication scheme on server 140. FIG. 7 is a flow diagram of an example of a routine 700 for implementing such an authentication scheme. Routine 700 may implement processes according to one or more of program modules stored in memory 146.

In block 701, the shared secret may be stored in client device 120. In some embodiments, shared secret 401 is a symmetric encryption key. Alternatively, an asymmetric key pair can be used for shared secret 401. In embodiments where shared secret 401 is an asymmetric key pair, client device 120 may store one of the keys from the pair, and authentication module 222 may store the other key from the pair.

In block 702, shared secret 401 is stored in authentication module 222, shown in FIG. 4 as shared secret 401. This may require some coordination between the manufacturer of client device 120 and the operator of web service 141. For example, the manufacturer may embed the shared secret in a tamper-proof memory in client device 120, and provide shared secret 401 through secure channels to the operator of web service 141.

In block 703, client device 120 may prepare a request for web service 141. The request may be an unencrypted block of data identifying the particular electronic content that is requested from web service 141. The request may also include information identifying client device 120 to authentication module 222.

Next, in block 704, client device 120 may sign the request for web service 121 using shared secret 401. For example, client device 120 may compute a hash as a function of the request plus shared secret 401. Client device 120 may append the hash to the request as a signature. In some embodiments, client device 120 may also encrypt the signed request. In block 705, client device 120 may send the signed request to server 140. Next, in block 706, authentication module 222 may verify the signature on the request using signature verifier 402. For example, signature verifier 402 may compute the hash function of the request plus the shared secret, and compare the hash value to the appended signature. If the values match, authentication module 222 considers the request intact, e.g., no attacker has manipulated the request. In block 707, client device 120 is allowed to access web service 141 if the signature on the request is verified. Otherwise, in block 708, access to web service 141 is prevented.

As one of ordinary skill in the art will appreciate, one or more of blocks 501-508, 601-609, and 701-708 may be optional and may be omitted from implementations in certain embodiments. Furthermore, in some implementations, blocks 501-508, 601-607, and 701-708 may be reordered, include substitute steps, and/or include additional steps.

Additional Uses of Tokens

As discussed, authentication module 224 may use a secure token to authenticate communications with untrusted client device 170. In the implementation discussed, trusted partner server 180 may perform authentication processing with untrusted client device 170, and trusted partner server 180 may transmit a secure token to untrusted client device 170. However, a secure token implementation is not limited to use with any particular authentication module. Rather, secure tokens can be implemented in addition to any of authentication modules 221-225.

In some embodiments, a secure token may be based on a symmetric cryptographic key. The symmetric key may be shared in some secure manner between server 140 and a particular client device. In some embodiments, client devices are pre-populated with a token based on the symmetric key. For example, before client device 110 is distributed to a user, a hash function of the MAC 10, serial number, or combination of the two may be calculated using the symmetric key as an input to the hash function. In some embodiments, the symmetric key may be generated along with the corresponding token at the time a user receives client device 110 (e.g., when a user purchases the device from a retailer such as an online store). In other embodiments, the token may be created by server 140 using an asymmetric key pair. A private key from the pair may be used to encrypt the secure token before providing the secure token to client device 110.

Once client device 110 is populated with the secure token, the secure token may be used for further security. For example, if the secure token is used in conjunction with authentication module 221, the user may not need to authenticate using a user name and password once the SSL/TSL session is established between server 140 and client device 110. Rather, client device 110 may transmit the secure token to server 140. Server 140 may decrypt the token using the symmetric key, or, if asymmetric encryption is used, the public key from the key pair. This implementation saves the user some inconvenience in having to submit their user name and password each time they wish to access web service 141, because the token can be used as a substitute for the user name and password.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing email or browser software.

Clause 1. A computer-implemented method for providing access to a service, comprising:
storing authentication modules to authenticate devices requesting access to the service, the devices including at least a first plurality of devices having a first device type and a second plurality of devices having a second device type;
configuring a first one of the authentication modules to perform authentication of the first plurality of devices using an authentication scheme specific to the first device type;
configuring a second one of the authentication modules to perform authentication of the second plurality of devices using an authentication scheme specific to the second device type;
receiving, by a server, a request to access the service, the request including a device type identifier of a device requesting the service;
extracting the device type identifier from the request;
determining whether the device type identifier corresponds to the first device type or the second device type;
selecting the first authentication module if the device type identifier corresponds to the first device type, and selecting the second authentication module if the device type identifier corresponds to the second device type;
authenticating the request using the selected authentication module to determine whether the requesting device is permitted to access the service, thereby performing authentication of the requesting device using the authentication scheme specific to the requesting device; and
providing access to the service when the selected authentication module determines that the requesting device is authorized to access the service, and preventing access to the service when the selected authentication module determines that the requesting device is not authorized to access the service.

Clause 2. The computer-implemented method according to clause 1, further comprising:
configuring a third one of the authentication modules to automatically authenticate requests corresponding to a third device type; and
forwarding the requests corresponding to the third device type to an alternate service having a built-in authentication scheme for authenticating the third device type.

Clause 3. The computer-implemented method according to clause 1, further comprising:
configuring a third one of the authentication modules to authenticate selected requests by:
determining IP addresses associated with the selected requests;
comparing the IP addresses to a list of allowable IP addresses; and
providing access to the service if the IP addresses associated with the selected requests are included in the list of allowable IP addresses.

Clause 4. The computer-implemented method according to clause 1, wherein the first authentication module uses Secure Sockets Layer (SSL) to determine whether the requesting device is authorized to access the service.

Clause 5. A computer-implemented method for providing access to a service, comprising:
receiving a request to access a service, the request including a device type identifier of a device requesting access to the service;
extracting the device type identifier from the request;
determining a corresponding device type for the requesting device;
selecting an authentication module from a plurality of authentication modules based on the device type identifier, the selected authentication module implementing an authentication scheme for the device type of the requesting device;
authenticating the request using the selected authentication module to determine whether the requesting device is permitted to access the service; and
providing access to the service based on at least a determination that the requesting device is authorized to access the service.

Clause 6. The computer-implemented method according to clause 5, wherein the selected authentication module shares secret data with the requesting device to determine whether the requesting device is authorized to access the service.

Clause 7. The computer-implemented method according to clause 5, wherein the selected authentication module provides access to a plurality of methods, and a subset of the methods are accessible to unauthenticated devices.

Clause 8. The computer-implemented method according to clause 5, wherein a plurality of devices having a plurality of device types access the service through the selected authentication module.

Clause 9. The computer-implemented method according to clause 5, wherein at least two of the authentication modules are accessed using a common URL.

Clause 10. The computer-implemented method according to clause 5, wherein a trusted partner server provides a token to the requesting device, the method further comprising:
receiving a copy of the token from the requesting device; and
providing access to the service based on a determination that the copy of the token is authentic.

Clause 11. The computer-implemented method according to clause 10, wherein the token is encrypted with a private key corresponding to a public key from a private/public key pair, the method further comprising:
decrypting the token with the corresponding public key to determine whether the token is authentic.

Clause 12. The computer-implemented method according to clause 10, wherein the token is provided to the requesting device by the trusted partner server after the trusted partner server verifies a user name and password combination received from the requesting device.

Clause 13. The computer-implemented method according to clause 5, further comprising:
pre-storing a token in the requesting device before receiving the request from the requesting device; and
authenticating the request using the selected authentication module by verifying that the request is accompanied by the pre-stored token.

Clause 14. The computer-implemented method according to clause 5, wherein the selected authentication module uses Secure Sockets Layer (SSL) to determine whether the requesting device is authorized to access the service.

Clause 15. A server for providing access to a service, the server comprising:
a processor for executing program instructions; and
a computer-readable medium storing the program instructions, the program instructions, when executed by the processor, performing a process to:
receive a request to access a service, the request including a device type identifier of a device requesting access to the service;
extract the device type identifier from the request;
determine a corresponding device type for the requesting device;
select an authentication module from a plurality of authentication modules based on the device type identifier, the selected authentication module implementing an authentication scheme for the device type of the requesting device;
authenticate the request using the selected authentication module to determine whether the requesting device is permitted to access the service; and
provide access to the service based on at least a determination that the requesting device is authorized to access the service.

Clause 16. The server according to clause 15, wherein the selected authentication module uses Secure Sockets Layer (SSL) to determine whether the requesting device is authorized to access the service.

Clause 17. The server according to clause 15, wherein the selected authentication module shares secret data with the requesting device to determine whether the requesting device is authorized to access the service.

Clause 18. A computer-readable medium storing program instructions for performing a method executed by a processor, the method providing access to a service and comprising steps performed by the processor of:
receiving a request to access a service, the request including a device type identifier of a device requesting access to the service;
extracting the device type identifier from the request;
determining a corresponding device type for the requesting device;
selecting an authentication module from a plurality of authentication modules based on the device type identifier, the selected authentication module implementing an authentication scheme for the device type of the requesting device;
authenticating the request using the selected authentication module to determine whether the requesting device is permitted to access the service; and
providing access to the service based on at least a determination that the requesting device is authorized to access the service.

Clause 19. The computer-readable medium according to clause 18, wherein the selected authentication module uses Secure Sockets Layer (SSL) to determine whether the requesting device is authorized to access the service.

Clause 20. The computer-readable medium according to clause 18, wherein the selected authentication module shares secret data with the requesting device to determine whether the requesting device is authorized to access the service.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as nonexclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:
1. A computer-implemented method for providing access to a service, comprising:
storing authentication modules to authenticate devices requesting access to the service, the devices including at least a first plurality of devices having a first device type and a second plurality of devices having a second device type;
configuring a first one of the authentication modules to perform authentication of the first plurality of devices using an authentication scheme specific to the first device type;
configuring a second one of the authentication modules to perform authentication of the second plurality of devices using an authentication scheme specific to the second device type;
configuring a third one of the authentication modules to receive requests corresponding to a third device type, wherein the third one of the authentication modules forwards requests corresponding to the third device type to a trusted partner device having an alternate authentication scheme for authenticating the third device type;
receiving, by a server, a request to access the service, the request including a device type identifier of a device requesting the service;
extracting the device type identifier from the request;
determining whether the device type identifier corresponds to the first device type, the second device type, or third device type;
selecting the first authentication module if the device type identifier corresponds to the first device type, selecting the second authentication module if the device type identifier corresponds to the second device type, and selecting the third authentication module if the device type identifier corresponds to the third device type;
authenticating the request using the selected authentication module to determine whether the requesting device is permitted to access the service, thereby performing authentication of the requesting device using the authentication scheme specific to the requesting device; and
providing access to the service when the selected authentication module determines that the requesting device is authorized to access the service, and preventing access to the service when the selected authentication module determines that the requesting device is not authorized to access the service.

2. A computer-implemented method for providing access to a service, comprising:
- receiving a request to access a service, the request including a device type identifier of a device requesting access to the service;
- extracting the device type identifier from the request;
- determining a corresponding device type for the requesting device;
- selecting an authentication module from a plurality of authentication modules based on the device type identifier, wherein one of the plurality of authentication modules is selected based on the device type being an unknown device type having an unknown device type identifier;
- authenticating the request for the device type of the requesting device using the selected authentication module to determine whether the requesting device is permitted to access the service, wherein the authenticating includes forwarding the request corresponding to the unknown device type to a trusted partner device having an alternate authentication scheme;
- providing access to the service based on at least a determination that the requesting device is authorized to access the service; and preventing access to the service when the selected authentication module determines that the requesting device is not authorized to access the service.

3. The computer-implemented method according to claim 2, wherein the selected authentication module shares secret data with the requesting device to determine whether the requesting device is authorized to access the service.

4. The computer-implemented method according to claim 2, wherein a plurality of devices having a plurality of device types access the service through the selected authentication module.

5. The computer-implemented method according to claim 2, wherein at least two of the authentication modules are accessed using a common uniform resource locator (URL).

6. The computer-implemented method according to claim 2, wherein the trusted partner device provides a token to the requesting device in response to the trusted partner device authenticating the unknown device type, the method further comprises:
- receiving a copy of the token from the requesting device; and
- providing access to the service based on a determination that the copy of the token is authentic.

7. The computer-implemented method according to claim 6, wherein the token is encrypted with a private key corresponding to a public key from a private/public key pair, the method further comprising:
- decrypting the token with the corresponding public key to determine whether the token is authentic.

8. The computer-implemented method according to claim 6, wherein the token is provided to the requesting device by the trusted partner device after the trusted partner device authenticates a user request to access a service by determining that a user Internet Protocol (IP) address is included in a white list of allowable IP addresses stored in memory on the trusted partner device.

9. The computer-implemented method according to claim 2, further comprising:
- pre-storing a token in the requesting device before receiving the request from the requesting device; and
- authenticating the request using the selected authentication module by verifying that the request is accompanied by the pre-stored token.

10. The computer implemented method according to claim 1, further comprising:
- receiving from the third device type a token to gain access to the service, the token provided in response to the trusted partner device authenticating the third device type; and
- providing access to the service based on a determination that the token is authentic.

11. The computer-implemented method according to claim 10, wherein the token is provided to the requesting device by the trusted partner device in response to the trusted partner device authenticating a user request to access a service by determining that a user Internet Protocol (IP) address is included in a white list of allowable IP addresses stored in memory on the trusted partner device.

12. A server for providing access to a service, the server comprising:
- a processor for executing program instructions; and
- a computer-readable medium storing the program instructions, the program instructions, when executed by the processor, performing a process to:
  - receive a request to access a service, the request including a device type identifier of a device requesting access to the service;
  - extract the device type identifier from the request;
  - determine a corresponding device type for the requesting device;
  - select an authentication module from a plurality of authentication modules based on the device type identifier, wherein one of the plurality of authentication modules is selected based on the device type being an unknown device type having an unknown device type identifier;
  - authenticate the request for the device type of the requesting device using the selected authentication module to determine whether the requesting device is permitted to access the service, wherein the request corresponding to the unknown device type is forwarded to a trusted partner device having an alternate authentication scheme, wherein the alternate authentication scheme authenticates the unknown device type, and in response to the authenticating the unknown device type, providing the requesting device with a token; and
  - provide access to the service based on at least a determination that the requesting device is authorized to access the service.

13. The server according to claim 12, wherein the selected authentication module shares secret data with the requesting device to determine whether the requesting device is authorized to access the service.

14. A non-transitory computer-readable medium storing computer-executable instructions for performing a method executed by a processor, the method providing access to a service and comprising steps performed by the processor of:
- receiving a request to access a service, the request including a device type identifier of a device requesting access to the service;
- extracting the device type identifier from the request;
- determining a corresponding device type for the requesting device;
- selecting an authentication module from a plurality of authentication modules based on the device type identifier, wherein one of the plurality of authentication modules is configured to receive requests corresponding to unknown device type having an unknown device type identifier;

authenticating the request for the device type of the requesting device using the selected authentication module to determine whether the requesting device is permitted to access the service, wherein the request corresponding to the unknown device type is forwarded to a trusted partner device having an alternate authentication scheme, wherein the alternate authentication scheme provides the unknown device type with a token; and providing access to the service based on at least a determination that the requesting device is authorized to access the service.

15. The non-transitory computer-readable medium according to claim 14, wherein the selected authentication module shares secret data with the requesting device to determine whether the requesting device is authorized to access the service.

16. The non-transitory computer-readable medium according to claim 14 wherein the providing access to the service for the unknown device type further comprises:

receiving a token from the unknown device type, and determining that the token is authentic.

\* \* \* \* \*